US008558874B2

(12) United States Patent
Watanabe

(10) Patent No.: US 8,558,874 B2
(45) Date of Patent: Oct. 15, 2013

(54) IMAGE PROCESSING DEVICE AND METHOD, AND COMPUTER READABLE RECORDING MEDIUM CONTAINING PROGRAM

(75) Inventor: Mikio Watanabe, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 880 days.

(21) Appl. No.: 12/543,297

(22) Filed: Aug. 18, 2009

(65) Prior Publication Data

US 2010/0060719 A1 Mar. 11, 2010

(30) Foreign Application Priority Data

Sep. 8, 2008 (JP) ................................ 2008-229542

(51) Int. Cl.
*H04N 13/02* (2006.01)
*H04N 5/228* (2006.01)
*H04N 5/76* (2006.01)

(52) U.S. Cl.
USPC ............... 348/47; 348/222.1; 348/231.99; 348/231.2; 348/231.3

(58) Field of Classification Search
USPC .............. 348/47, 222.1, 231.99, 231.2, 231.3
See application file for complete search history.

(56) References Cited

U.S. PATENT DOCUMENTS

| 5,798,791 A * | 8/1998 | Katayama et al. ......... 348/218.1 |
| 6,141,036 A * | 10/2000 | Katayama et al. .............. 348/47 |
| 6,839,081 B1 * | 1/2005 | Iijima et al. ..................... 348/46 |
| 7,733,385 B2 | 6/2010 | Watanabe et al. |
| 2003/0016871 A1 | 1/2003 | Shinagawa et al. |
| 2004/0070673 A1 | 4/2004 | Nakamura |
| 2004/0252205 A1 * | 12/2004 | Onoda ....................... 348/231.3 |
| 2005/0243187 A1 | 11/2005 | Watanabe et al. |
| 2006/0082644 A1 * | 4/2006 | Tsubaki ......................... 348/42 |
| 2008/0158369 A1 * | 7/2008 | Watanabe ................ 348/207.99 |

FOREIGN PATENT DOCUMENTS

| JP | 10-13860 | 1/1998 |
| JP | 2000-32379 | 1/2000 |
| JP | 2004-120165 | 4/2004 |
| JP | 2004-274091 A | 9/2004 |
| JP | 2005-252754 A | 9/2005 |
| JP | 2006-113807 | 4/2006 |
| JP | 2008-167064 A | 7/2008 |

OTHER PUBLICATIONS

European Search Report dated Jan. 24, 2011.
Notice of Reasons for Rejection, dated Oct. 12, 2010, with English translation.

* cited by examiner

*Primary Examiner* — Chikaodili E Anyikire
(74) *Attorney, Agent, or Firm* — McGinn IP Law Group, PLLC

(57) ABSTRACT

A plurality of original images of a subject viewed from different viewpoints are acquired. Then, at least one interpolation image to interpolate at least one new viewpoint between the viewpoints of the original images or outside the viewpoints of the original images is generated from the original images. Then, identification information indicating whether each image is the original image or the interpolation image and viewpoint information representing the order of viewpoint of each image are added to the original images and the interpolation image, and the original images and the interpolation image with the identification information and the viewpoint information added thereto are stored in an associated fashion.

16 Claims, 7 Drawing Sheets

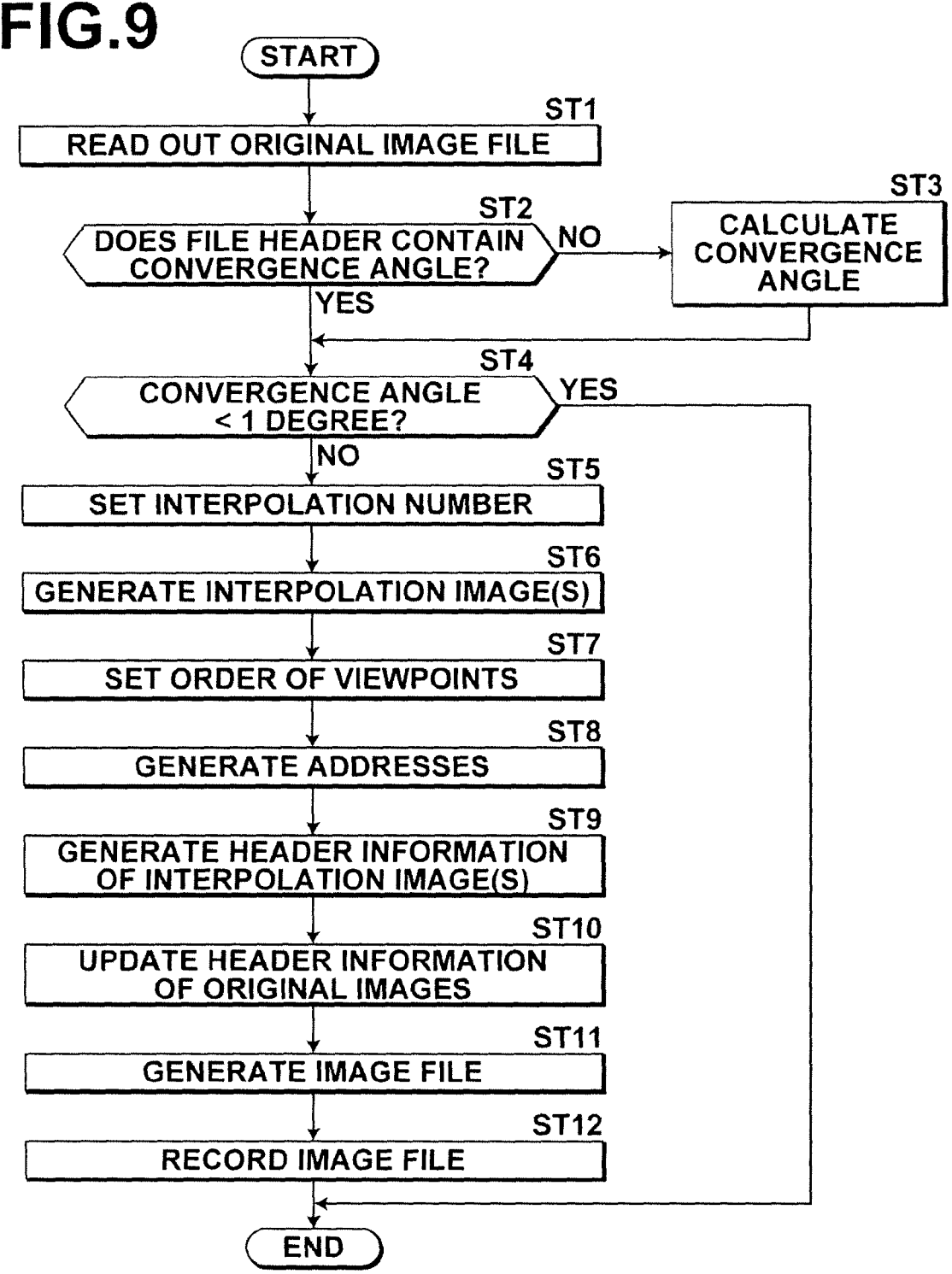

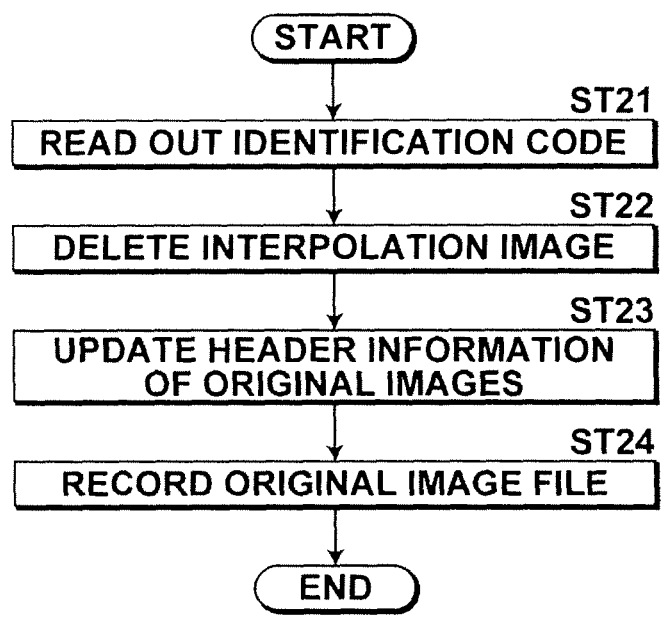

IMAGE PROCESSING DEVICE AND METHOD, AND COMPUTER READABLE RECORDING MEDIUM CONTAINING PROGRAM

BACKGROUND OF THE INVENTION

1. Field of the Invention

The present invention relates to an image processing device and method for generating an interpolation image to interpolate a new viewpoint from a plurality of original images viewed from different viewpoints, and a computer readable recording medium containing a program for causing a computer to carry out the image processing method.

2. Description of the Related Art

A stereoscopic image which allows stereoscopic viewing based on a disparity can be acquired with a stereoscopic imaging device, such as a stereo camera, which acquires images using at least a pair of imaging means placed at different positions. Such a stereoscopic imaging device acquires two left right images by imaging the same subject from different viewpoints with the pair of imaging means which are provided with a convergence angle between optical axes thereof, and generates the stereoscopic image, which allows stereoscopic viewing based on a disparity, from the two images.

A technique to store the plurality of images acquired by the stereoscopic imaging device as a single image file has been proposed (see U.S. Patent Application Publication No. 20050243187). According to this technique, these images can be managed as a single image file, thereby preventing large increase of the number of image files.

In stereoscopic imaging, a larger convergence angle between the imaging means for acquiring the stereoscopic images results in a larger disparity between the acquired images. If the disparity between the images is excessively large, a disparity between the left and right images in the horizontal direction on the stereoscopic display plane is too large to provide a natural view. In this case, the disparity between adjacent images can be reduced by estimating a new viewpoint between the positions of the imaging means and generating an interpolation image which interpolates between the two images, thereby allowing good stereoscopic viewing. It should be noted that the viewpoint of the interpolation image to be generated may be estimated not only between the viewpoints of the plurality of images but also outside the viewpoints of the plurality of images.

When the interpolation image is generated in this manner, however, the original images which have been acquired through imaging and the generated interpolation image are managed as separate files. This may often lead to confusion between the original images and the interpolation image, and when the interpolation image is re-created from the original images or only the interpolation image is deleted to reduce the file volume, the original image may erroneously be deleted.

SUMMARY OF THE INVENTION

In view of the above-described circumstances, the present invention is directed to facilitating management of the original images and the interpolation image.

An aspect of the image processing device according to the invention includes: image acquiring means for acquiring a plurality of original images of a subject viewed from different viewpoints; interpolation image generating means for generating, from the original images, at least one interpolation image to interpolate at least one new viewpoint between the viewpoints of the original images or outside the viewpoints of the original images; and storing means for adding identification information and viewpoint information to the original images and the interpolation image, the identification information indicating whether each image is the original image or the interpolation image and the viewpoint information representing an order of viewpoint of each image, and storing the original images and the interpolation image in an associated fashion with the identification information and the viewpoint information added thereto.

The description "storing the original images and the interpolation image in an associated fashion" means that the original images and the interpolation image are associated in an integral fashion in view of management of the images. Specifically, the original images and the interpolation image may be stored in an associated fashion by, for example, storing the original images and the interpolation image in the same folder, assigning a common file name to the original images and the interpolation image, storing the original images and the interpolation image in a single file, or recording, in the header of at least one of the original images and the interpolation image, file names of the other images. It should be noted that, even when the original images and the interpolation image are stored in an associated fashion, operations on, such as accessing to, one of the original images and the interpolation image are permitted.

In the image processing device according to the invention, the storing means may store the original images and the interpolation image as a single image file.

In the image processing device according to the invention, the storing means may store the interpolation image at an area following areas for storing the original images in the image file.

The description "stores the interpolation image at an area following areas for storing the original images" means, for example, that, when the original images and the interpolation image are recorded in an integral fashion in successive address spaces of a recording medium, the area storing the interpolation image may be a subordinate area to the areas storing the original images.

In the image processing device according to the invention, when an instruction to reduce a file volume is made, the storing means may delete only the interpolation image.

The "instruction to reduce a file volume" may include, for example, an instruction to increase available space of a recording medium for recording the image file of the original images and the interpolation image, an instruction to delete the image file, or an instruction to transfer the image file, which is more easily achieved when the file volume is smaller.

The "instruction to reduce a file volume" may be made for one of the associated image files of the original images and interpolation image. For example, when the file volume is reduced by deletion, a deletion menu including an instruction to delete all the original images and the interpolation image with respect to a selected image and an instruction to reduce the volume with respect to the selected image may be provided. Then, if the latter is instructed, only the interpolation image may be deleted. If, for example, the user has instructed to delete some of the original images and the interpolation image (for example, one interpolation image), presence of images related to the selected image may be notified to the user, and the fact that the above-described deletion menu (or at least the instruction to reduce the volume in the deletion menu) is prepared may be presented to the user.

In the image processing device according to the invention, when the original images are acquired through imaging, the interpolation image generating means may determine a number of the at least one interpolation image based on a positional relationship between imaging means used to acquire the original images.

The positional relationship between the imaging means used to acquire the original images may include, for example, at least one of a convergence angle and a baseline length of the plurality of imaging means.

An aspect of the imaging device according to the invention includes: a plurality of imaging means disposed at different positions from each other for acquiring the original images; and the image processing device according to the invention.

An aspect of the image processing method according to the invention includes: acquiring a plurality of original images of a subject viewed from different viewpoints; generating, from the original images, at least one interpolation image to interpolate at least one new viewpoint between the viewpoints of the original images or outside the viewpoints of the original images; and adding identification information and viewpoint information to the original images and the interpolation image, the identification information indicating whether each image is the original image or the interpolation image and the viewpoint information representing an order of viewpoint of each image, and storing the original images and the interpolation image in an associated fashion with the identification information and the viewpoint information added thereto.

It should be noted that the image processing method according to the invention may also be provided in the form of a computer readable recording medium containing a program for causing a computer to carry out the image processing method.

EFFECT OF THE INVENTION

According to the invention, the identification information indicating whether each image is the original image or the interpolation image and the viewpoint information representing the order of viewpoint are added to each of the original images and the at least one interpolation image, and the original images and the interpolation image with the identification information and the viewpoint information added thereto are stored in an associated fashion. This facilitates management of the original images and the interpolation image. In particular, since the identification information indicating whether each image is the original image or the interpolation image is added to each of the original images and the interpolation image, such a situation that the original image is erroneously deleted can be prevented. Further, addition of the viewpoint information representing the order of viewpoint facilitates generation of the stereoscopic image and re-creation of the interpolation image.

Further, by storing the original images and the interpolation image as the single image file, the number of files is not largely increased, thereby facilitating management of the original images and the interpolation image.

In this case, if the interpolation image is stored at an area following areas for storing the original images in the image file, it is not necessary to re-create the file when the interpolation image is deleted, thereby facilitating deletion of the interpolation image.

Moreover, when an instruction to reduce the file volume is made, only the interpolation image can be deleted, thereby facilitating reduction of the file volume.

In addition, by determining the number of the at least one interpolation image based on the positional relationship between the imaging means used to acquire the original images when the original images are acquired through imaging, appropriate number of interpolation images can be generated to provide appropriate number of viewpoints.

BRIEF DESCRIPTION OF THE DRAWINGS

FIG. 9 is a flow chart illustrating a process carried out when the interpolation image is generated in one embodiment of the invention, and FIG. 10 is a flow chart illustrating a process carried out when an instruction to reduce the file volume is made.

DESCRIPTION OF THE PREFERRED EMBODIMENTS

Figure 1:
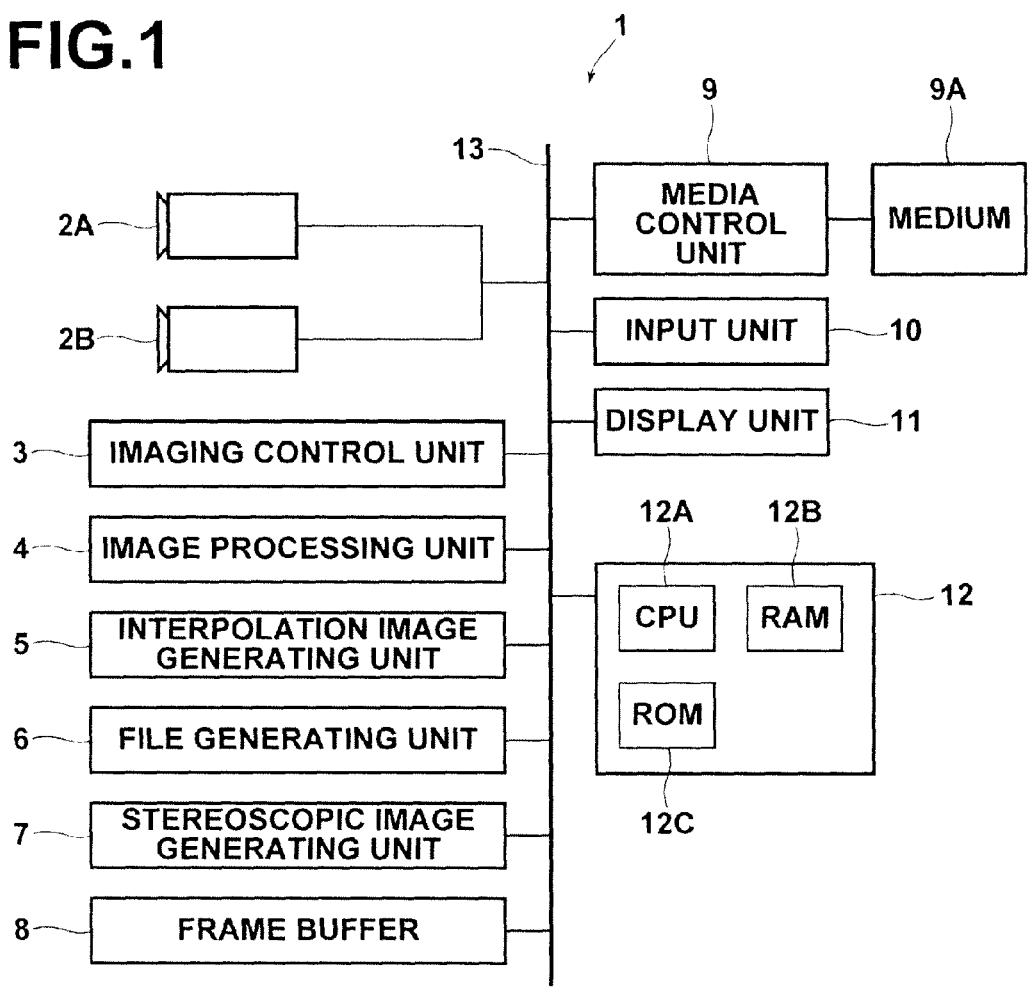
FIG. 1 is a schematic block diagram illustrating the configuration of a stereoscopic imaging device to which an image processing device according to one embodiment of the present invention is applied.

Hereinafter, an embodiment of the present invention will be described with reference to the drawings. FIG. 1 is a schematic block diagram illustrating the configuration of a stereoscopic imaging device to which an image processing device according to the embodiment of the invention is applied. As shown in FIG. 1, the stereoscopic imaging device 1 according to this embodiment includes two imaging units 2A and 2B, an imaging control unit 3, an image processing unit 4, an interpolation image generating unit 5, a file generating unit 6, a stereoscopic image generating unit 7, a frame buffer 8, a media control unit 9, an input unit 10 including operation buttons for various inputs, a display unit 11, such as a liquid crystal monitor, for displaying various items, and a controller 12, which are connected via a bus 13.

Figure 2:
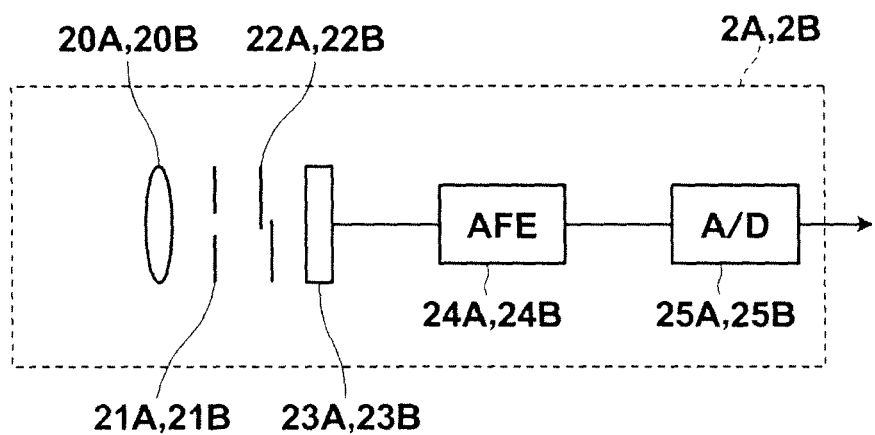
FIG. 2 is a diagram illustrating the configuration of each imaging unit.
Figure 3:
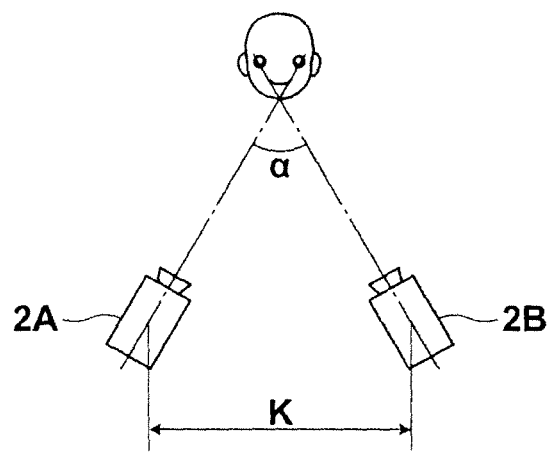
FIG. 3 is a diagram for explaining placement of the imaging units.

FIG. 2 illustrates the configuration of the imaging units 2A and 2B. As shown in FIG. 2, each of the imaging units 2A and 2B includes a lens 20A, 20B, an aperture diaphragm 21A, 21B, a shutter 22A, 22B, a CCD 23A, 23B, ananalog front end (AFE) 24A, 24B and an A/D converting unit 25A, 25B. It should be noted that, as shown in FIG. 3, the imaging units 2A and 2B are placed to view a subject with a convergence angle $\alpha$ and a predetermined baseline length K. It should be noted that information of the convergence angle $\alpha$ and the baseline length K are stored in a ROM 12C, which will be described later.

Each of the lenses 20A and 20B is formed by a plurality of lenses having their respective functions, such as a focusing lens for focusing on the subject and a zooming lens for effecting a zooming function, and the position of each lens is adjusted by a lens driving unit (not shown) based on focused focal position data obtained through AF processing carried out by the imaging control unit 3 and zoom data obtained through operation of a zoom lever (not shown).

Aperture diameters of the aperture diaphragms 21A and 21B are adjusted by a diaphragm aperture driving unit (not shown) based on aperture value data obtained through AE processing carried out by the imaging control unit 3.

The shutters 22A and 22B are mechanical shutters, and are driven by a shutter driving unit (not shown) according to a shutter speed obtained through the AE processing.

Each of the CCDs 23A and 23B includes a photoelectric surface, on which a large number of light-receiving elements are arranged two-dimensionally. A light image of the subject is focused on each photoelectric surface and is subjected to photoelectric conversion to obtain an analog imaging signal. Further, a color filter formed by regularly arrayed R, G and B color filters are disposed on the front side of each CCD 23A, 23B.

The AFEs 24A and 24B process the analog imaging signals fed from the CCDs 23A and 23B to remove noise from the analog imaging signals and adjust gain of the analog imaging signals (this operation is hereinafter referred to as "analog processing").

The A/D converting units 25A and 25B convert the analog imaging signals, which have been subjected to the analog processing by the AFEs 24A and 24B, into digital imaging signals. The images represented by digital image data acquired by the imaging units 2A and 2B are referred to as images L1 and R1, respectively.

The imaging control unit 3 includes an AF processing unit and an AE processing unit (not shown). When a release button included in the input unit 10 is half-pressed, the imaging units 2A and 2B acquire preliminary images, and the AF processing unit determines focal distances for the lenses 20A and 20B based on the preliminary images and outputs the information to the imaging units 2A and 2B. The AE processing unit determines an aperture value and shutter speed based on the preliminary images, and outputs the information to the imaging units 2A and 2B. It should be noted that predetermined focal position, aperture value and shutter speed may be used for imaging without carrying out the AF processing and the AE processing.

When the release button is fully pressed, the imaging control unit 3 instructs the imaging units 2A and 2B to acquire the images L1 and R1 which are actually used to generate a stereoscopic image. It should be noted that, before the release button is operated, the imaging control unit 3 instructs the imaging units 2A and 2B to acquire live view images, which have fewer pixels than the actual images, for checking imaging ranges of the imaging units 2A and 2B.

Figure 4:
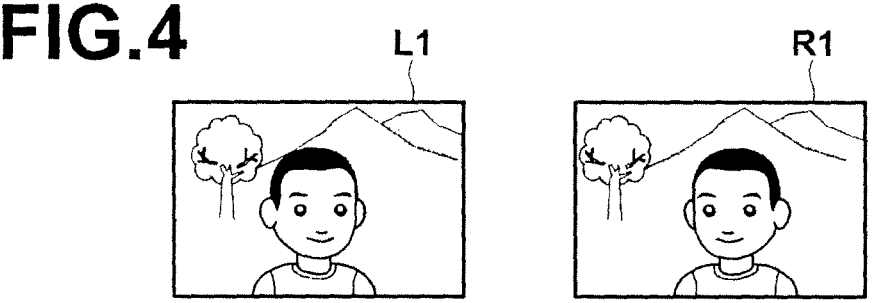
FIG. 4 illustrates an example of original images.

As shown in FIG. 3, the images L1 and R1 are acquired by imaging the subject from two different imaging positions. As shown in FIG. 4, there is a disparity between images of the subject contained in the images L1 and R1 depending on a difference between the imaging positions. It should be noted that the images L1 and R1 are acquired at imaging positions of the imaging units 2A and 2B, i.e., imaging positions on the left and right facing the subject, and a stereoscopic image is generated based on the images L1 and R1. Therefore, in the following description, the images L1 and R1 are referred to as original images L1 and R1. The image L1 is displayed on the left and the image R1 is displayed on the right when the stereoscopic image is generated.

Although the stereoscopic image is generated from the two original images L1 and R1 in this embodiment, three or more imaging units may be provided and more than one images may be generated from three or more original images acquired through imaging at three or more different imaging positions.

The image processing unit 4 applies, to the digital image data of the original images L1 and R1 acquired by the imaging units 2A and 2B, correction to correct for, for example, misalignment between angles of view of the imaging units 2A and 2B, difference between zooming factors, misalignment between images due to rotation of the CCD, and trapezoidal distortion due to the imaging units 2A and 2B imaging the subject with the convergence angle α therebetween, and image quality correction, such as white balance adjustment, tone correction, sharpness correction and color correction. In this description, the original images L1 and R1 which have been processed by the image processing unit 4 are also designated by the same reference symbols L1 and R1.

The interpolation image generating unit 5 generates at least one interpolation image from the original images L1 and R1 acquired through imaging or the original images L1 and R1 which have been acquired through imaging and recorded in a medium 9A. In this embodiment, the number of the interpolation images to be generated is determined depends on the magnitude of the convergence angle α of the imaging units 2A and 2B.

When a stereoscopic image is generated and used for stereoscopic viewing, if the convergence angle of the imaging units 2A and 2B is as large as one degree or more, for example, the disparity between the original images L1 and R1, that is, the disparity between left and right images in the horizontal direction on a stereoscopic display plane, is too large to provide a natural view. Therefore, the interpolation image generating unit 5 determines whether or not the convergence angle α of the imaging units 2A and 2B described in the ROM 12C or described as header information of an image file, which will be described later, is less than one degree. If the angle is not less than one degree, the interpolation image generating unit 5 sets, as an interpolation number N (i.e., the number of interpolation images), a maximum N value which provides a value obtained by dividing the convergence angle α with N+1 being less than one. Namely, the maximum N value that satisfies the relationship of inequality (1) below is found and set as the interpolation number N:

$$1 \text{ degree} < \alpha/(N+1) \quad (1)$$

Then, the interpolation images of the set interpolation number N are generated.

In some cases, the stereoscopic imaging device 1 according to this embodiment may generate the interpolation image from images which have been acquired by an imaging device (or devices) with a different convergence angle from that of the imaging units 2A and 2B of the stereoscopic imaging device 1. There is no problem if the convergence angle is described in the header of the image file of the images; however, the convergence angle may not be described. In this case, the interpolation image generating unit 5 finds corresponding points between the original images, and calculates the convergence angle based on the corresponding points.

Figure 5:
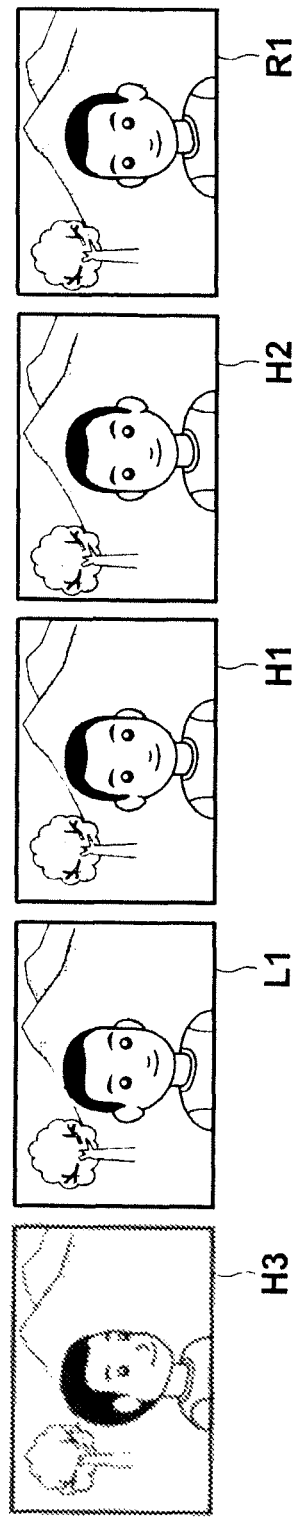
FIG. 5 is a diagram for explaining generation of interpolation images.

FIG. 5 is a diagram for explaining generation of the interpolation image. In this example, the interpolation number is two. As shown in FIG. 5, the interpolation image generating unit 5 generates two interpolation images H1 and H2 from the original images L1 and R1. The interpolation images H1 and H2 are generated such that a convergence angle between the original image L1 and the interpolation image H1 next to each other, a convergence angle between the interpolation image H1 and the interpolation image H2 next to each other, and a convergence angle between the interpolation image H2 and the original image R1 next to each other are the same.

The interpolation image generating unit 5 generates the interpolation images H1 and H2 by applying morphing to the original images L1 and R1 such that the disparity between the corresponding pixels contained in the original images L1 and R1 is gradually decreased. Specifically, corresponding points between the left and right images are detected, and the corresponding points are connected to each other with straight lines or curved lines. Then, the straight lines or curved lines are divided to calculate quasi-corresponding points. Then, the original images L1 and R1 are deformed to conform to the quasi-corresponding points to generate the interpolation images H1 and H2. Alternatively, any of known techniques, such as one disclosed in U.S. Patent Application Publication No. 20030016871, may be used.

It should be noted that, although the interpolation images generated in this example represent images viewed from viewpoints between the viewpoints from which the original images L1 and R1 are viewed, an interpolation image H3 viewed from a viewpoint outside the original image L1, as shown in FIG. 5, may be generated by estimating the viewpoint outside the original image L1.

Figure 6:
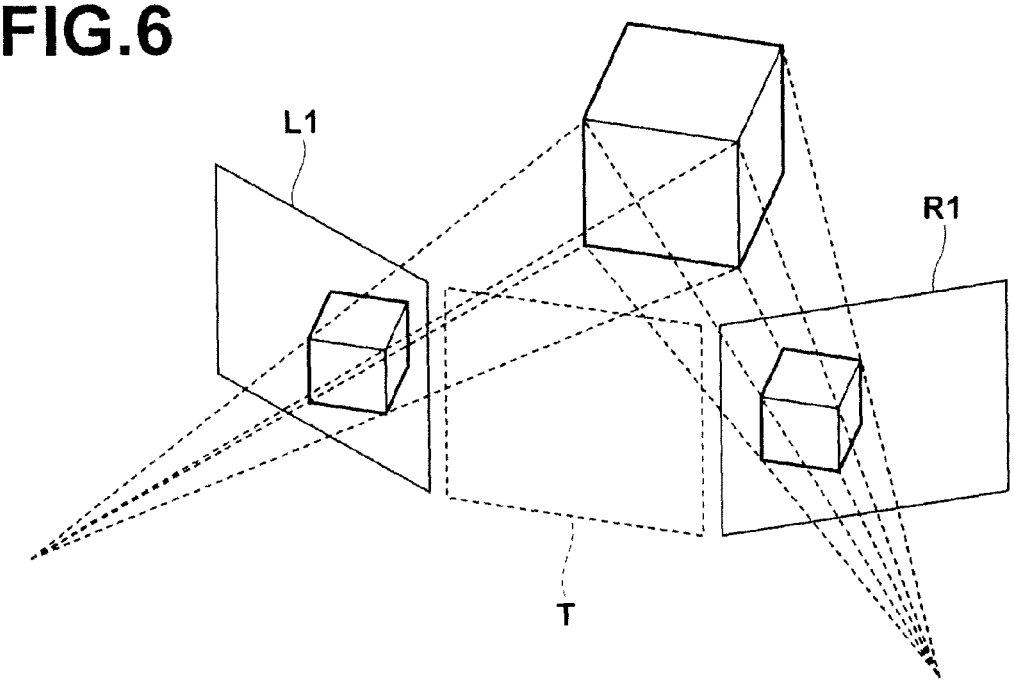
FIG. 6 illustrates a relationship between a 3D shape model and image projection planes on which the original images are acquired.

In stead of applying morphing, a 3D shape model of the subject contained in the original images L1 and R1 may be generated to generate the interpolation images from the 3D shape model. The 3D shape model can be created by finding corresponding points between the original images L1 and R1, and calculating distances from the imaging positions to the corresponding points on the subject according to the principle of triangulation based on the disparity between the corresponding points. When the subject is imaged by imaging units 2A and 2B to provide the original images L1 and R1, each of the original images L1 and R1 is formed by a projection image formed by a collection of intersection points between straight lines connecting points on the subject with the focal point of each imaging unit 2A, 2B and an image projection plane (a plane corresponding to the imaging surface of each of the CCDs 23A and 23B of the imaging units 2A and 2B) onto which the image is projected. FIG. 6 illustrates a relationship between the 3D shape model and the image projection planes on which the original images L1 and R1 are acquired. In this example, the 3D shape model is a cube, for the purpose of explanation. As shown in FIG. 6, the interpolation image may be generated by setting a hypothetical image projection plane or planes T of the number corresponding to the interpolation number (the interpolation number is one in the example of FIG. 6) between the image projection planes of the original images L1 and R1, and calculating a projection image on the hypothetical image projection plane T.

The file generating unit 6 compresses the image data of the original images L1 and R1 according to a certain compression format, such as JPEG, to generate an original image file F0. In a case where the interpolation images H1 and H2 are generated, an image file F1 is generated from the image data of the original images L1 and R1 and the interpolation images H1 and H2. A header storing associated information, such as imaging time and date, based, for example, on the Exif format is added to the image file.

Figure 7:
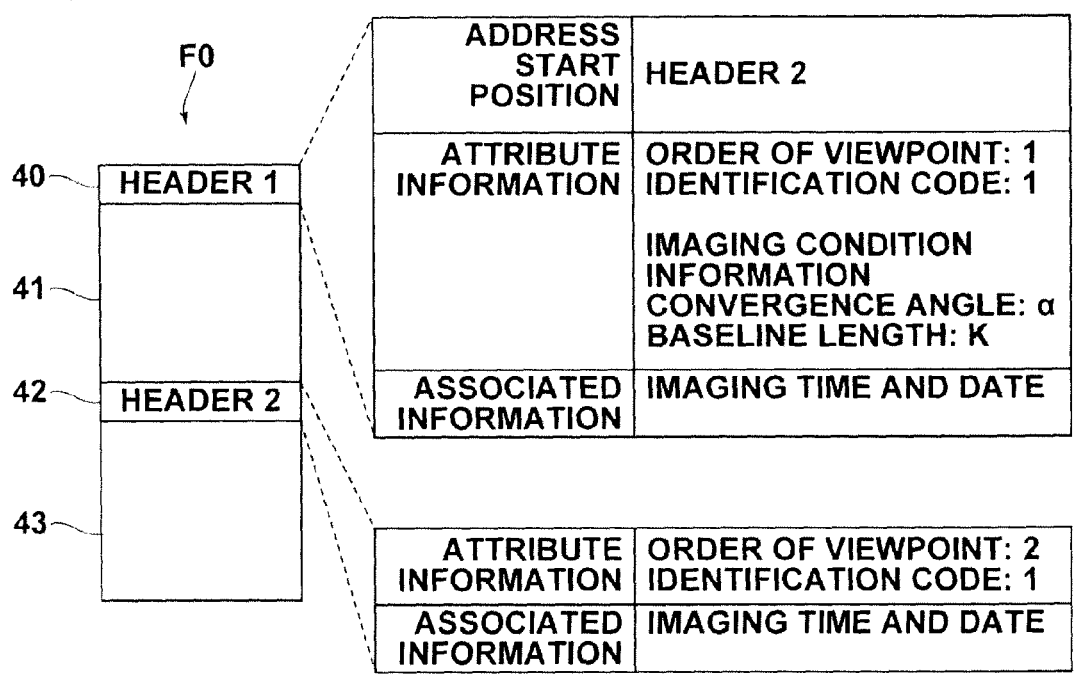
FIG. 7 is a diagram illustrating the file composition of an original image file according to one embodiment of the invention.

FIG. 7 illustrates the file composition of the original image file in this embodiment. As shown in FIG. 7, the image file F0 includes a header area (header 1) 40 for the original image L1, an image data area 41 for the original image L1, a header area (header 2) 42 for the original image R1, and an image data area 43 for the original image R1, which are arranged in this order.

In the header area 40 for the original image L1, address start position, attribute information and associated information are described as header information. The address start position contains a start position of the address of the header area 42 of the original image R1, which is described in the form of a list. The attribute information contains the order of viewpoint, image identification code and imaging condition information. The order of viewpoint represents the order of the viewpoints when the original images L1 and R1 are viewed from the left, and the order of viewpoint for the original image L1 and that for the original image R1 are respectively "1" and "2". The image identification code is information indicating whether the image stored in the image data area corresponding to the header area is the original image or the interpolation image. Namely, if the image is the original image, the code is "1", and if the image is the interpolation image, the code is "2". The imaging condition information contains the convergence angle α and the baseline length K of the imaging units 2A and 2B, and the information stored in the ROM 12C is used. Thus, for the original image L1, the order of viewpoint is "1", and the image identification code is "1" which indicates that the image is the original image. The associated information contains the imaging time and date.

The header area 42 for the original image R1 contains, as the header information, the attribute information of the original image R1, i.e., the order of viewpoint (=2) and the image identification code (=1).

Figure 8:
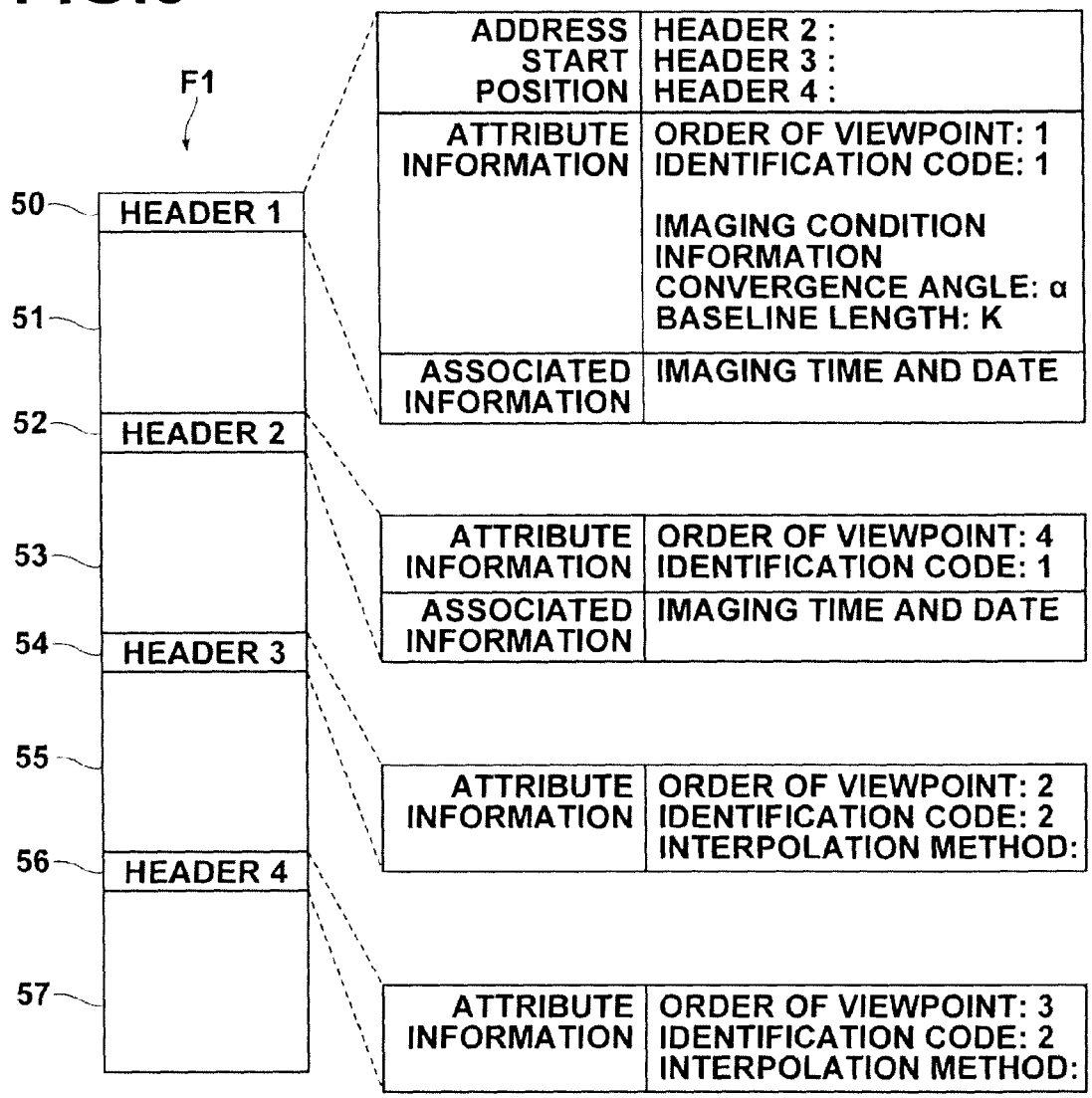
FIG. 8 is a diagram illustrating the file composition of an image file containing the original images and the interpolation images according to one embodiment of the invention.

FIG. 8 illustrates the file composition of the image file containing the original images and the interpolation images in this embodiment. As shown in FIG. 8, the image file F1 includes a header area (header 1) 50 for the original image L1, an image data area 51 for the original image L1, a header area (header 2) 52 for the original image R1, an image data area 53 for the original image R1, a header area (header 3) 54 for the interpolation image H1, an image data area 55 for the interpolation image H1, a header area (header 4) 56 for the interpolation image H2 and an image data area 57 for the interpolation image H2, which are arranged in this order.

The header area 50 for the original image L1 contains, as the header information, the address start position, the attribute information and the associated information. The address start position contains start positions of addresses of the header areas 52, 54 and 56 of the original image R1 and the interpolation images H1 and H2 (i.e., the headers 2, 3 and 4), which are described in the form of a list. The attribute information contains the order of viewpoint, the image identification code and the imaging condition information. The order of viewpoint represents the order of the viewpoints when the original images L1 and R1 and the interpolation images H1 and H2 are viewed from the left, and the order of viewpoint for the original image L1, the order of viewpoint for the interpolation image H1, the order of viewpoint for the interpolation image H2 and the order of viewpoint for the original image R1 are respectively "1", "2", "3", and "4". The image identification code is information indicating whether the image stored in the image data area corresponding to the header area is the original image or the interpolation image. Namely, if the image is the original image, the code is "1", and if the image is the interpolation image, the code is "2". The imaging condition information contains the convergence angle α and the baseline length K of imaging units 2A and 2B. Thus, for the original image L1, the order of viewpoint is "1", and the image identification code is "1" which indicates that the image is the original image. The associated information contains the imaging time and date.

The header area 52 for the original image R1 contains, as the header information, the attribute information of the original image R1, i.e., the order of viewpoint (=4) and the image identification code (=1).

The header area 54 for the interpolation image H1 contains, as the header information, the attribute information of the interpolation image H1, i.e., the order of viewpoint (=2), the image identification code (=2) and information of an interpolation method used. The interpolation method here is a technique used to generate the interpolation image, and in this case, information of the technique used by the interpolation image generating unit 5 to generate the interpolation images H1 and H2 is described.

The header area 56 for the interpolation image H2 contains, as the header information, the attribute information of the interpolation image H2, i.e., the order of viewpoint (=3), the image identification code (=2) and the information of the interpolation method used.

The stereoscopic image generating unit 7 applies, to the original images L1 and R1 and the interpolation images H1 and H2, stereoscopic display processing to generate a stereoscopic image to allow stereoscopic viewing on the display unit 11. It should be noted that the conversion for stereoscopic display can be achieved, for example, by overlapping the images forming a pair (i.e., the adjacent images with respect to the order of the viewpoints) with changing the colors of the images into red and blue, for example (anaglyph system), by overlapping the images forming a pair with converting the images to have different polarization directions (polarization filter system), or by combining the images forming a pair line by line in an alternating manner (parallax barrier system and lenticular system), depending on the manner of stereoscopic viewing and whether the display unit 11 is a 3D liquid crystal display.

The frame buffer 8 is a storing unit for temporarily storing the image to be displayed on the display unit 11.

The media control unit 9 accesses the recording medium 9A to control writing and reading of the image file F0.

The controller 12 controls the units of the device 1 and includes a CPU 12A, a RAM 12B, which provides work space for various processing carried out by the device 1, such as generating the interpolation image, generating the stereoscopic image, generating the image file and displaying the stereoscopic image, as will be described later, and the ROM 12C, which stores operation programs for the device 1, various constants, etc.

Next, processes carried out in this embodiment are described. FIG. 9 is a flow chart illustrating a process carried out when the interpolation image is generated in this embodiment. In this example, the original images L1 and R1 have been acquired through imaging and recorded in the medium 9A. When an instruction to generate the interpolation image is inputted via the input unit 10, the controller 12 starts the process and the media control unit 9 reads out the original image file F0 from the medium 9A (step ST1). The original image file F0 is decompressed in the RAM 12B, and the interpolation image generating unit 5 determines whether or not the convergence angle α is described in the imaging condition information contained in the header information of the original image file F0 (step ST2). If the determination in step ST2 is negative, the convergence angle α is calculated from the distribution of the corresponding points between the original images L1 and R1 (step ST3). It should be noted that, in a case where the convergence angle α is always described in the original image file F0, the determination in step ST2 may be omitted.

If determination in step ST2 is affirmative, or after step ST3, determination is made as to whether or not the convergence angle α is less than one degree (step ST4). If the determination in step ST4 is affirmative, it is not necessary to generate the interpolation image, and the process ends. At this time, an alarm informing that it is not necessary to generate the interpolation image may be displayed on the display unit 12. If the determination in step ST4 is negative, the interpolation image generating unit 5 sets the interpolation number (step ST5). Setting of the interpolation number is achieved by calculating the maximum value of N that satisfies the above described inequality (1).

Then, the interpolation image generating unit 5 generates the interpolation image (or images) of the interpolation number N from the original images L1 and R1 (step ST6). Subsequently, the file generating unit 6 sets the order of the viewpoints of the original images L1 and R1 and the interpolation image (step ST7), and generates the addresses of the data areas for the original images L1 and R1 and the interpolation image in the image file to be generated (step ST8). Then, the file generating unit 6 generates the header information for the interpolation image (step ST9), updates the header information for the original images L1 and R1 (step ST10), and generates the image file F1 from the original images L1 and R1 and the interpolation image (step ST11). Then, the media control unit 9 records the image file F1 in the medium 9A (step ST12), and the process ends.

Next, a process carried out when an instruction to reduce the file volume of the generated image file F1 is made is described. FIG. 10 is a flow chart illustrating the process carried out when the instruction to reduce the file volume is made. The "instruction to reduce the file volume" here may include, for example, an instruction to increase available space of a recording medium for recording the image file, or an instruction to transfer data, which is more easily achieved when the file volume is smaller.

When the instruction to reduce the file volume is made via the input unit 10, the controller 12 starts the process, and the identification code is read from the header information contained in the image file F1 (step ST21). Then, the header area and the image data area of the image which has the identification code indicating that the image is the interpolation image is deleted from the image file F1 ("delete interpolation image" in step ST22). Further, the header information of each of the remaining original images L1 and R1 is updated (step ST23). Specifically, the order of viewpoint in the header information of each of the original images L1 and R1 is changed. That is, if the image file F1 contains the original images L1 and R1 and the two interpolation images H1 and H2, the values of the order of viewpoint of the original images L1 and R1 are 1 and 4, respectively, and after the interpolation images are deleted, the values of the order of viewpoint of the original images L1 and R1 are changed to 1 and 2, respectively. Further, information about the interpolation images is deleted from the list of the address start positions contained in the header information of the original image L1. Then, the media control unit 9 records the original image file F0 in the medium 9A (step ST24), and the process ends.

As described above, in this embodiment, the identification code representing the type of the image, i.e., the original image or the interpolation image, and the viewpoint information representing the viewpoint position are described in the header information of the original images L1 and R1 and the interpolation image, and the original images L1 and R1 and the interpolation image each added with the header containing the identification code and the viewpoint information are stored as the single image file F1. This facilitates management of the original images L1 and R1 and the interpolation image. In particular, since the identification code representing the type of the image is added to each of the original images L1 and R1 and the interpolation image, such a situation that the original image is erroneously deleted can be prevented. Further, addition of the viewpoint information representing the viewpoint position facilitates generation of the stereoscopic image and re-creation of the interpolation image.

Furthermore, by storing the original images L1 and R1 and the interpolation image as the single image file F1, the number of files is not largely increased, thereby facilitating management of the original images L1 and R1 and the interpolation image.

Moreover, since the interpolation image is stored at the area following the areas for storing the original images L1 and R1 in the image file F1, it is not necessary to re-create the file when the interpolation image is deleted, thereby facilitating deletion of the interpolation image.

In addition, when an instruction to reduce the file volume is made, only the interpolation image can be deleted, thereby facilitating reduction of the file volume.

Although the interpolation image is generated according to the instruction to generate the interpolation image in the above-described embodiment, the interpolation image may automatically be generated after the acquisition of the original images L1 and R1 through imaging.

In the above-described embodiment, the area of the interpolation image is deleted when the instruction to reduce the file volume is made. At this time, the information of the interpolation number may be kept in the header information to facilitate later recomposition of the interpolation image from the original images L1 and R1.

Although the image processing device according to the invention is applied to the stereoscopic imaging device including the imaging units 2A and 2B in the above-described embodiment, the image processing device according to the invention may be provided alone. In this case, images acquired by imaging the same subject from different positions are fed to the image processing device, and the image file F1 is generated in the same manner as in the above-described embodiment. In this case, the image file F1 can be generated in the same manner as in the above-described embodiment not only when the interpolation image is generated from the original images L1 and R1 acquired through imaging, but also when, for example, the interpolation image is generated from original images generated using a computer graphics technique.

Although the original images L1 and R1 and the interpolation image are associated to each other by storing the original images L1 and R1 and the interpolation image in a single file in the above-described embodiment, the original images L1 and R1 and the interpolation image may be associated to each other in any other manner as long as they are associated in an integral fashion, such as storing the original images L1 and R1 and the interpolation image in the same folder, assigning a common file name to the original images L1 and R1 and the interpolation image, or recording, in the header of at least one of the original images L1 and R1 and the interpolation image, file names of the other images.

The image processing device 1 according to one embodiment of the invention has been described. The invention may also be implemented in the form of a program for causing a computer to function as means corresponding to the interpolation image generating unit 5 and the file generating unit 6 described above and to carry out the processes shown in FIGS. 9 and 10. The invention may also be implemented in the form of a computer readable recording medium containing such a program.

What is claimed is:

1. An image processing device, comprising:
    an image acquiring unit for acquiring a plurality of original images of a subject viewed from different viewpoints taken with a plurality of imaging units;
    an interpolation image generating unit for determining whether a convergence angle between the plurality of imaging units is less than a predetermined angle, and if the determination is negative, determining a number of interpolation images to interpolate a new viewpoint between the viewpoints of the original images, and generating, from the original images, the determined number of the interpolation images; and
    a storing unit for adding identification information and viewpoint information to the original images and the interpolation image, the identification information indicating whether each image comprises an original image of the original images or the interpolation image and the viewpoint information representing an order of viewpoint of each image, and storing the original images and the interpolation image in an associated fashion with the identification information and the viewpoint information added thereto.

2. The image processing device as claimed in claim 1, wherein the storing unit stores the original images and the interpolation image as a single image file.

3. The image processing device as claimed in claim 2, wherein the storing unit stores the interpolation image at an area following areas for storing the original images in the image file.

4. The image processing device as claimed in claim 1, wherein, when an instruction to reduce a file volume is made, the storing unit deletes only the interpolation image.

5. The image processing device as claimed in claim 1, wherein the interpolation image generating unit determines, as the number of the interpolation images, a maximum N value that provides a value less than the predetermined angle when the convergence angle is divided by (N+1).

6. An imaging device, comprising:
    a plurality of imaging units disposed at different positions from each other for acquiring a plurality of original images of a subject viewed from different viewpoints; and
    the image processing device as claimed in claim 1.

7. An image processing method, comprising:
    acquiring a plurality of original images of a subject viewed from different viewpoints taken with a plurality of imaging units;
    determining whether a convergence angle between the plurality of imaging units is less than a predetermined angle;
    if the determination is negative, determining a number of interpolation images to interpolate a new viewpoint between the viewpoints of the original images;
    generating, from the original images, the determined number of the interpolation images; and
    adding identification information and viewpoint information to the original images and the interpolation image, the identification information indicating whether each image comprises an original image of the original images or the interpolation image, and the viewpoint information representing an order of viewpoint of each image, and storing the original images and the interpolation image in an associated fashion with the identification information and the viewpoint information added thereto.

8. A non-transitory computer readable recording medium comprising a program for causing a computer to carry out an image processing method, the method comprising:
    acquiring a plurality of original images of a subject viewed from different viewpoints taken with a plurality of imaging units;

determining whether a convergence angle between the plurality of imaging units is less than a predetermined angle;

if the determination is negative, determining a number of interpolation images to interpolate a new viewpoint between the viewpoints of the original images;

generating, from the original images, the determined number of the interpolation images; and adding identification information and viewpoint information to the original images and the interpolation image, the identification information indicating whether each image comprises an original image of the original images or the interpolation image, and the viewpoint information representing an order of viewpoint of each image, and storing the original images and the interpolation image in an associated fashion with the identification information and the viewpoint information added thereto.

9. The image processing device as claimed in claim 1, wherein the interpolation image generating unit determines the convergence angle based on corresponding points between the original images.

10. The image processing device as claimed in claim 1, wherein the interpolation image generating unit determines whether information of the convergence angle is added to the original images, and if the determination is affirmative, the interpolation image generating unit obtains the information of the convergence angle added to the original images, and if the determination is negative, the interpolation image generating unit determines the convergence angle based on corresponding points between the original images.

11. The image processing device as claimed in claim 1, wherein the interpolation image generating unit estimates a viewpoint outside the viewpoints of the original images, and generates an interpolation image corresponding to the estimated viewpoint.

12. The image processing device as claimed in claim 1, wherein the interpolation image generating unit determines, as the number of the interpolation images, a maximum value that provides a value less than the predetermined angle.

13. The method of claim 7, wherein in said determining the number of the interpolation images, the number of the interpolation images is determined as a maximum N value that provides a value less than the predetermined angle when the convergence angle is divided by (N+1).

14. The method of claim 7, wherein in said determining the number of the interpolation images, the number of the interpolation images is determined as a maximum value that provides a value less than the predetermined angle.

15. The non-transitory computer readable recording medium of claim 8, wherein in said determining the number of the interpolation images, the number of the interpolation images is determined as a maximum N value that provides a value less than the predetermined angle when the convergence angle is divided by (N+1).

16. The non-transitory computer readable recording medium of claim 8, wherein in said determining the number of the interpolation images, the number of the interpolation images is determined as a maximum value that provides a value less than the predetermined angle.

* * * * *